United States Patent [19]

Smith

[11] Patent Number: 4,588,070
[45] Date of Patent: May 13, 1986

[54] BAG TRANSFER DEVICE

[75] Inventor: David A. Smith, Midland, Mich.

[73] Assignee: The Dow Chemical Company, Midland, Mich.

[21] Appl. No.: 670,515

[22] Filed: Nov. 13, 1984

[51] Int. Cl.$^4$ ............................................ B65G 47/22
[52] U.S. Cl. ................................ 198/468.3; 198/458; 271/268; 294/104; 414/43; 414/753
[58] Field of Search .......................... 414/43, 751, 753; 198/458, 486, 468.3; 271/85, 268; 294/104

[56] References Cited

U.S. PATENT DOCUMENTS

| | | | |
|---|---|---|---|
| 3,580,442 | 5/1971 | Rohdin et al. | 198/458 X |
| 3,774,778 | 11/1973 | Flaig | 414/751 X |
| 4,034,867 | 7/1977 | Akagawa | 414/753 |
| 4,050,574 | 9/1977 | Chenevard et al. | 198/458 |
| 4,284,301 | 8/1981 | Geiger et al. | 294/88 X |
| 4,372,538 | 2/1983 | Balfanz | 414/751 X |
| 4,383,788 | 5/1983 | Sylvander | 414/84 X |

Primary Examiner—Leslie J. Paperner
Attorney, Agent, or Firm—L. E. Hessenaur, Jr.

[57] ABSTRACT

Apparatus for clamping and transferring to another location stacks of bags or other products of varying sizes. The apparatus preferably includes sets of clamping jaws for grasping the stacks of bags. The jaws are designed for movement in more than one direction in substantially the same plane so that mechanisms for delivering and receiving bags can be used even if the bags from one stack vary in size from that in the next stack. Each set of clamping jaws supports as well as clamps each stack of bags, a lower support jaw being extended to a sufficient length to provide such support. The device can also accommodate bags or other products of varying wall thicknesses.

5 Claims, 3 Drawing Figures

BAG TRANSFER DEVICE

FIELD OF THE INVENTION

The present invention relates generally to the field of transferring thermoplastic bags or other products from one location to another for purposes of packaging the same.

DESCRIPTION OF THE PRIOR ART

The present invention is particularly concerned with a device adaptable to transferring stacks of bags of varying thicknesses and varying sizes from one location to another for packing into cartons or for other purposes. The prior art, as exemplified by U.S. Pat. No. 4,284,301, assigned to The Dow Chemical Company, provides a means only for transferring bags of varying thicknesses from one location to another. It fails to provide a system which is adaptable to varying sizes of bags. By failing to have such adaptability, the device of the above-identified patent is captive to use with only one sized product, that is, a different production line must be dedicated to each size of bag in such a prior art system.

SUMMARY OF THE INVENTION

The present invention involves a device for transferring a plurality of bags with varying wall thicknesses in a stack, in a horizontal direction, such as taught in the above-identified patent, and also laterally, so that different size bags can be moved from an initial in-feed position laterally over to a folding mechanism adapted for packaging the particular sized bag coming down a packaging line. To accomplish this purpose of lateral, as well as, horizontal movement of the transfer device, fixed guides required for the device of the above-identified patent had to be replaced by a new mechanism for supporting the stack of bags during the transfer movement. It was discovered that the lower clamp jaw could be extended from that taught in the above-identified patent so as to support the bags and thus eliminate the need for fixed guides. It was suprisingly found that the extention of the lower clamp jaws did not jam into or otherwise disturb a stack of bags as the jaws moved in to receive the stack.

The device of this invention considers the fact, that in handling a stack of bags each with a variable thickness, such as those with an integral zipper profile, the bags need to move so that the center line for a subsequent folding mechanism was not changed. The zipper profile location had to remain the same regardless of the bag size, in order to cooperate with a bag sealing mechanism located just before the device which mechanism uses the zippers as a reference point. A groove which tracks each bag through the sealing mechanism is machined into the seal drum which makes that location fixed. However, it was found that the center line of the bags needs to be reasonably controlled regardless of bag size for the packaging operation, although a little flexibility may be tolerated because the location where the bags are picked up can vary somewhat as the location of folds of each stack of bags as they are packaged can vary slightly. The ability to transfer products in more than one direction in substantially the same plane is also adaptable to products having the same thickness, should such be desired.

The present invention may be better understood by reference to the following detailed description taken in connection with the accompanied drawings in which like reference characters refer to like elements in the three figures.

DETAILED DESCRIPTION OF THE PREFERRED EMBODIMENT

Figure 1:
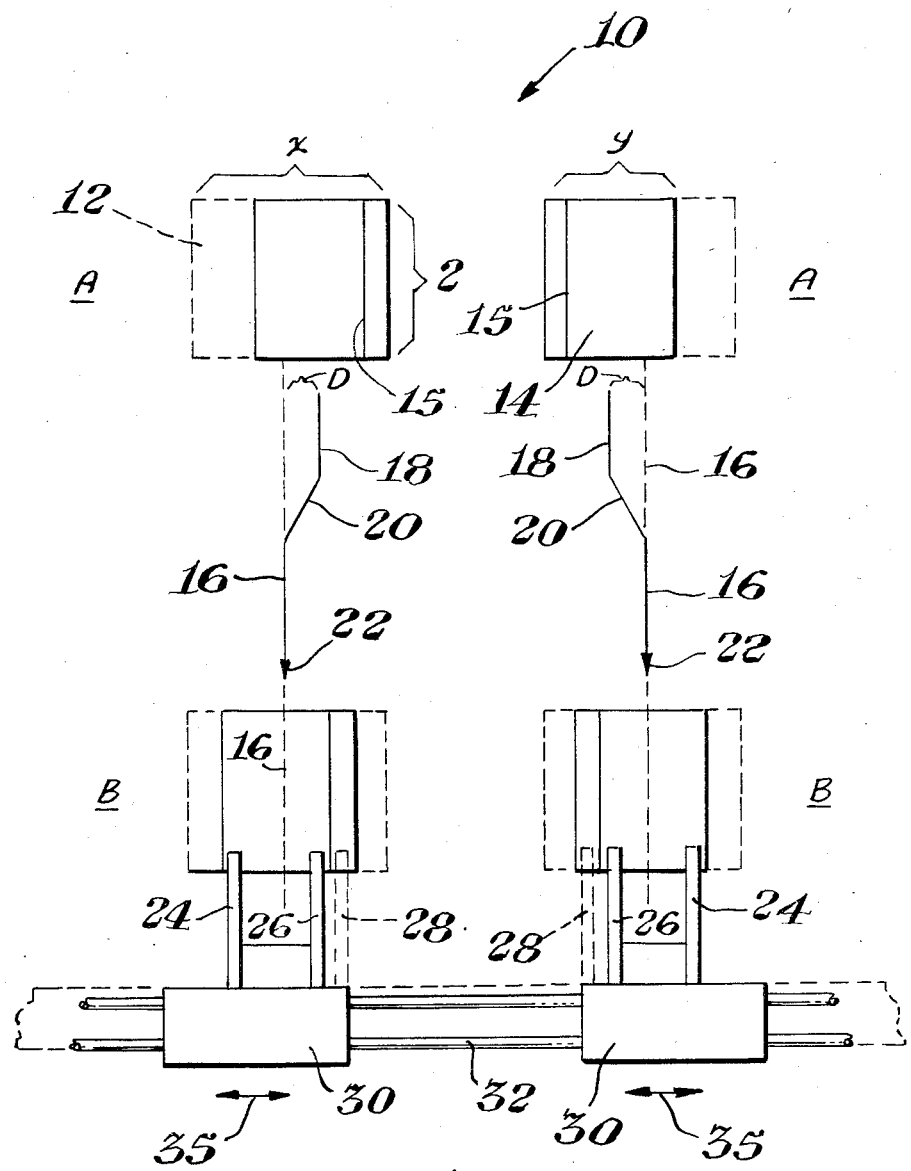
FIG. 1 is a schematic plan view showing the horizontal and lateral transferring of stacks of bags of varying thicknesses and varying sizes from a forming station to a packaging station.

Referring more particularly to FIG. 1, there is shown schematically the operation of a bag transfer device 10 of this invention, which is adapted to handle both a wide bag 12, shown partially in dotted line and having a width X, and a narrow bag 14, defined by the width Y. The confines of bag 12 overlap those of bag 14 and they have a common length dimension Z, and a common zipper profile location identified as 15.

In order to accomodate the packaging end of the machine for folding of the bags, as they are transferred from station A (just subsequent to forming) to station B (just prior to packaging), the center line of the stack of bags should reasonably coincide with that of any other stack of bags, regardless of size, as station B is approached. This center line is shown in FIG. 1 by the reference number 16, which is essentially half of the width of X, the width of the larger bag. Since the zipper profile 15 of both the larger bag 12 and the smaller bag 14, must substantially coincide because they come off of the same grooved, seal drum (not shown) in which a groove receives the zipper profile 15 for tracking, it is necessary to shift bag 14 from its normal center line 18 so that its center line eventually coincides with center line 16 employed for wider bag 12 prior to arriving at station B. This shift occurs along line 20 on both sides of the machine, which is a so-called "two-up" machine, both sides of which are essentially mirror images of the other as shown in the preferred embodiment. However, it is appreciated that the stacks of bags could have the same disposition or there could only be a single line of bags, and the principles of this invention could apply. The direction of travel of the bags is indicated by the arrow 22. The bags are picked up by clamping jaw sets 24/26 or 24/28 for accepting stacks of bags 12 or 14, respectively, at station A. Each set has a common clamping pair of jaws 24 to the outside, an uncommon clamping pair of jaws 26 and 28 on the inside; pair of jaws 28 being for the larger bag 12 and pair of jaws 26 being for the narrower or smaller bag 14. Each set 24/26 and 24/28 is carried on and extends from split base sections 30 (which can be the same base section 30 or different base sections 30 for each jaw set, which travel laterally back and forth perpendicular to the center line 16 on guides 32 as indicated by the arrows 35, in order to pick up the various size bags and maintain center line positioning for the folding mechanism to which the bags are transferred from station B to a packaging section (not shown), in a manner similar to that taught in the above-identified U.S. Pat. No. 4,284,301.

Referring more specifically to the transfer device of this invention, generally referenced by the character 10 in FIG. 2, there is a right side and a left side in viewing FIG. 2, which are essentially mirror images of one another and for purposes of this description only the operation of one side will be described. In this particular embodiment the narrower bags 14 with the Y dimension, as described in FIG. 1, are employed.

Figure 2:
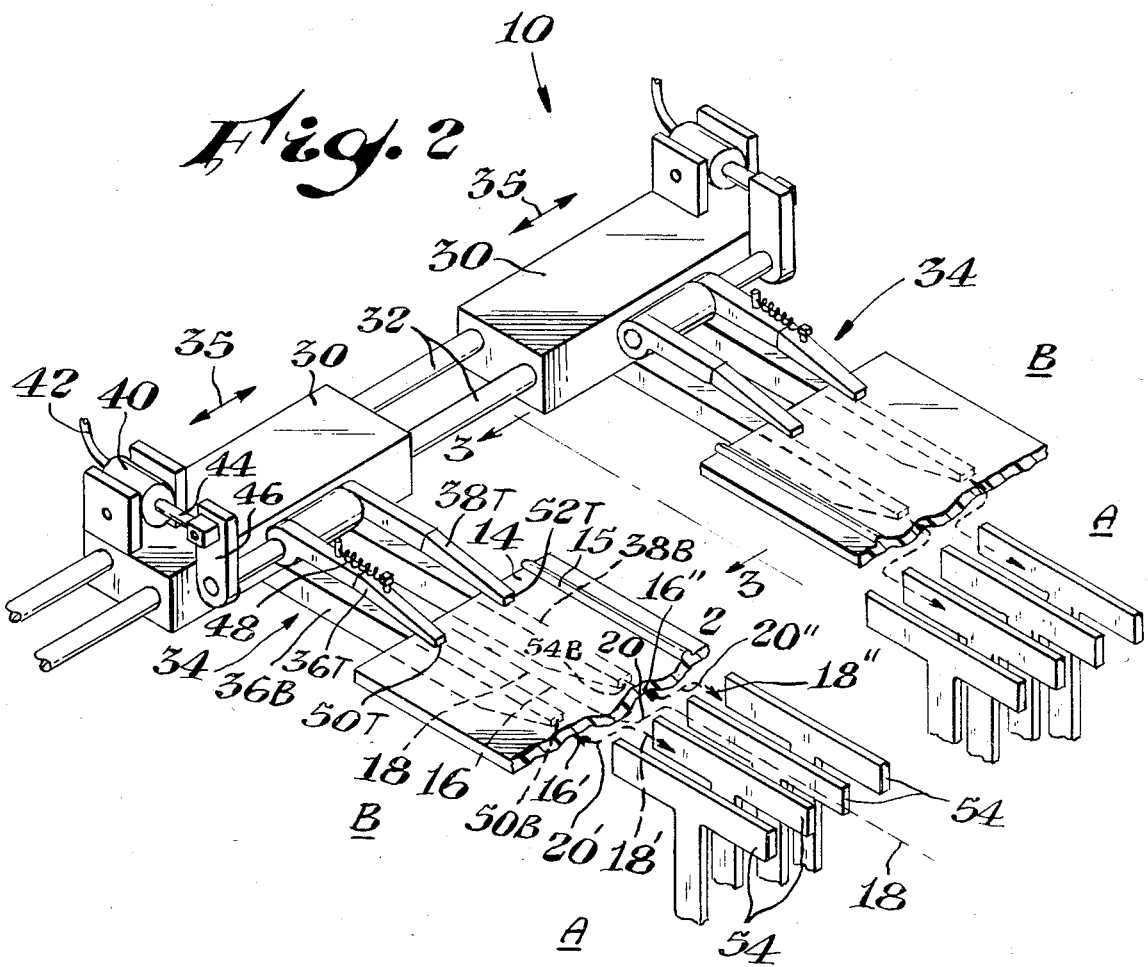
FIG. 2 is a fragmentary isometric view of a pair of clamping jaw sets which can affect the transfer schematically shown in FIG. 1.

A cam or equivalent mechanism (not shown) is employed, along an intermediate track section 20 so as to bring the center line of the bags 14 from that shown by track 18 adjacent station A to that shown by track 16 leading into Section B as indicated by the arrows in FIG. 2. Some other mechanisms such as a pneumatic or hydraulic cylinder, or a linkage mechanism may result in a different line of travel than track section 20 being followed in causing the center line of one stack of bags to substantially coincide with that of another stack of bags of a different size. For example, if the distance X minus Y is 3 inches, the lateral distance between center lines 16 and 18 would be 1½ inches, which is traversed along transition line 20. The lateral distance can vary somewhat and still be operable.

Each clamping jaw set 34 (made up of pairs of jaws 24/26 from FIG. 1) is adapted to hold a stack of plastic bags as they are moved from Station A to Station B as earlier described. Each clamping jaw set 34 which comprises an adjustable clamping jaw mechanism 36T/36B and 38T/38B, is operated by a pneumatic or hydraulic cylinder 40 connected by line 42 to a fluid imput (not shown). These cylinders 40 move a link 44 inwardly and outwardly to turn an arm 46 which opens and closes each clamping jaw set 34. Each clamping jaw set 34 can be operated independently of one another and can be moved laterally by conventional means (not shown) along guides 32 backwardly and forwardly as indicated by the arrow 35 to permit transfer of the bags from center line 18 to center line 16. A loaded spring or equivalant mechanism 48 is employed to make clamping jaws 36T adjustable as compared to jaws 38T, which remain fixed, all as similarly described in the above-identified patent. Lateral adjustment for clamping jaw sets 34 is provided by laterally movable bases 30 from which each clamping jaw assembly 34 extends.

One significant difference between this invention and that in the above-identified patent is that the guide supports for holding the bags in the prior art device must be eliminated due to the lateral movement of each stack of bags 14, and another means for supporting the stack of bags found. It has been discovered that adequate support for the bags can be attained by extending significantly the length of the lower clamping jaws 36B and 38B from that shown in the above-identified patent. Ends 50B of the lower clamping jaw 36B, which in the prior art did not extend significantly beyond ends 50T of the upper jaw 36T, extends much further than the ends 50T. As can be seen in both FIGS. 2 and 3, ends 50B extend essentially the majority of the length L of the bags when they are placed upon supporting T's or arms 54. Similarly the ends 52T of the clamping jaw 38T, can be of a conventional length, but the end 52B of bottom clamping jaw 38B is preferably of a length similar to that defined by the end 50B of the lower jaw clamping leg 36B. As can be seen, the center line 18 is illustrated between the jaws 36T/36B and 38T/38B and traverses a path 20 to center line 16 so that it would pass between about the middle of the two center T-supports 54 to pick up stacks of bags for transfer to Station B.

The jaws 36T/36B follow path 16', 20', and 18', and the jaws 38T/38B follows path 16", 20", and 18" parallelling the theoretical center line path 16, 20, and 18 traveled by bags 14.

Figure 3:
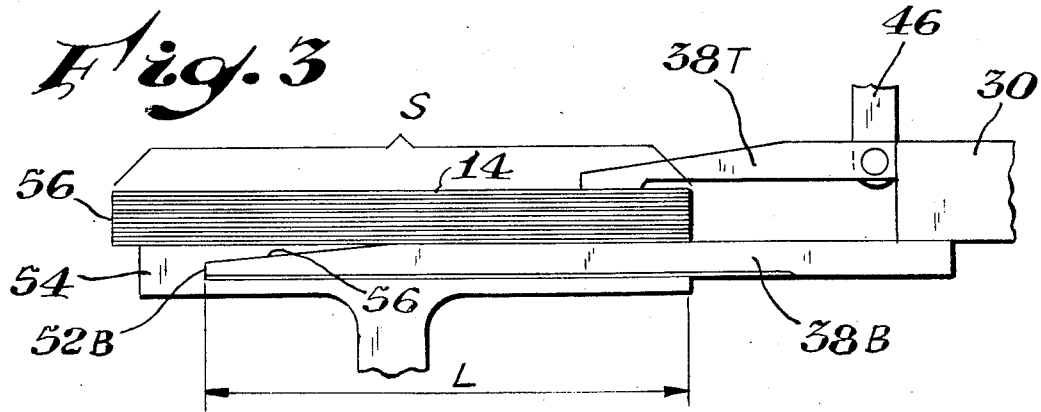
FIG. 3 is an enlarged fragmentary side view showing a mounting jaw and an extended lower clamp jaw to support a plurality of stacked bags.

Referring again to FIG. 3, this is an enlarged cutaway view taken along the line 3—3 of FIG. 2, showing in more detail how the stack of bags 14 are supported by the clamping jaws 38T/38B of clamping jaw assembly 34. More particularly it is shown how lower clamping jaw 38B supports as well as clamps stack of bags 14. To allow ready insertion under the stack of bags, end 52B is tapered at 56 so that insertion under the stack of bags 14 is eased. It is found that the end of 52 does not have to go full length to the end 56 of the stack of bags 14 to actually support the stack for pick up of the bags from the top of T-supports 54. FIG. 3 does illustrate the clamping jaws 38T/38B just after they have clamped the stack of bags by closing upper jaw 38T, thus being ready for removing the stack of bags 14 from the supports 54. It is then found that if the length L of lower clamping jaw 38B which is intended to be inserted under the stack of bags 14 extends at least half of the length S of the bags in stack 14, that adequate support can be obtained for the types of bags involved in the stack. This can vary, of course, according to the limpness of the bags as determined by the materials of construction and the gauge of the bag materials.

It is thus evident from the above description that the invention describes the method for lateral, as well as, horizontal transfer with clamping jaws of a stack of bags, which jaws not only secures the stack of bags in an adjustable fashion, but also provides adequate support for each stack of bags and permits the center line of the stack of bags to be varied to accommodate transfer of the stack of bags from one position to another. The above and other embodiments and modifications of the present invention are possible and are still in the scope of this invention, assuming that equilivent functions can be performed by alternative elements. For example, the dual horizontal and lateral movement functions and concepts of this invention could be adapted to stacks of products which do not have varying thicknesses or to single products which are not necessarily stacked. Likewise, it might be possible to effect the lateral movement of the products by having the supports 54 be laterally adjustable rather than the bases 30 for the clamping jaw assemblies.

What is claimed is:

1. A device for clamping and transferring a stack of plastic bags of varying size and including zipper profiles from one location to another comprising pairs of clamping jaw assemblies, means for moving each pair of clamping jaw assemblies in more than one direction in the same plane to accommodate transfer of the stacks of plastic bags from one location to another, said means for moving including means for causing the center line of one size of plastic bags to substantially coincide with the center line of differently sized plastic bags at least towards the end of the path of travel from one location to another of the plastic bags without changing the path of travel of the zipper profiles of said plastic bags.

2. The device of claim 1 wherein each clamping jaw assembly includes an upper jaw and a lower jaw, said lower jaw has a tapered end and extends a distance under said stack of plastic bags sufficient to support without jamming the same.

3. A device for clamping and transferring a stack of plastic bags of varying sizes and including zipper profiles from one location to another, said device comprising a pair of clamping jaw assemblies, one of said assemblies comprising a first jaw and a second jaw, means for driving said first jaw a given distance towards but fixedly spaced from the second jaw to clamp one thickness of said plastic bags, the other one of said assemblies comprising a first jaw and a second jaw, means for automatically biasly adjusting the second jaw of said other one of said assemblies towards the first jaw thereof and approaching a closed position therewith to clamp a thickness of said plastic bags different than said one thickness, and second adjustable jaw being flexible from said position so as to accomodate said different wall thicknesses of said plastic bags located between the jaws of said other one of said assemblies, means for moving each pair of clamping jaw assemblies in horizontal and lateral directions to accommodate stacks of plastic bags of varying sizes without changing the path of travel of the zipper profiles of said plastic bags in transferring the stacks of plastic bags from one location to another.

4. The device of claim 3 wherein said means for moving includes means for causing the center line of one stack of plastic bags to substantially follow the center line of another stack of a different size of plastic bags at least towards the end of the path of travel from one location to another of the stacks of plastic bags.

5. The device of claim 4 wherein the second jaw has a tapered end and extends a distance under said stacks of plastic bags sufficient to support without jamming the same.

* * * * *